(12) United States Patent
Trisnadi et al.

(10) Patent No.: US 8,259,069 B1
(45) Date of Patent: Sep. 4, 2012

(54) SPECKLE-BASED OPTICAL NAVIGATION ON CURVED TRACKING SURFACE

(75) Inventors: Jahja I. Trisnadi, Cupertino, CA (US); Clinton B. Carlisle, Palo Alto, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1273 days.

(21) Appl. No.: 12/008,527

(22) Filed: Jan. 11, 2008

(51) Int. Cl.
*G06F 3/33* (2006.01)

(52) U.S. Cl. ........ 345/167; 345/158; 345/160; 345/162; 345/163; 345/165

(58) Field of Classification Search .......... 345/156–169; 178/18.01, 18.09, 19.01, 19.05; 250/214 R, 250/221, 201.9, 207; 356/499, 498, 491; 351/491
See application file for complete search history.

(56) References Cited

U.S. PATENT DOCUMENTS

| | | | |
|---|---|---|---|
| 3,922,093 A | 11/1975 | Dandliker et al. | |
| 4,546,347 A | 10/1985 | Kirsch | |
| 4,692,003 A * | 9/1987 | Adachi et al. | ........... 351/212 |
| 4,799,055 A | 1/1989 | Nestler et al. | |
| 5,288,993 A | 2/1994 | Bidiville et al. | |
| 5,345,527 A | 9/1994 | Lebby et al. | |
| 5,457,533 A * | 10/1995 | Wilcken | ........... 356/491 |
| 5,473,344 A | 12/1995 | Bacon et al. | |
| 5,578,813 A | 11/1996 | Allen et al. | |
| 5,606,174 A | 2/1997 | Yoshimura et al. | |
| 5,644,139 A * | 7/1997 | Allen et al. | ........... 250/557 |
| D382,550 S | 8/1997 | Kaneko et al. | |
| D385,542 S | 10/1997 | Kaneko et al. | |
| 5,703,356 A | 12/1997 | Bidiville et al. | |
| 5,729,008 A | 3/1998 | Blalock et al. | |
| 5,729,009 A | 3/1998 | Dandliker et al. | |
| 5,781,229 A | 7/1998 | Zediker et al. | |
| 5,786,804 A | 7/1998 | Gordon | |
| 5,825,044 A | 10/1998 | Allen et al. | |
| 5,854,482 A | 12/1998 | Bidiville et al. | |
| 5,907,152 A | 5/1999 | Dandliker et al. | |
| 5,963,197 A | 10/1999 | Bacon et al. | |
| 5,994,710 A | 11/1999 | Knee et al. | |
| 6,031,218 A | 2/2000 | Piot et al. | |
| 6,037,643 A | 3/2000 | Knee | |
| 6,057,540 A | 5/2000 | Gordon et al. | |
| 6,097,371 A | 8/2000 | Siddiqui et al. | |
| 6,151,015 A | 11/2000 | Badyal et al. | |
| 6,172,354 B1 | 1/2001 | Adan et al. | |
| 6,222,174 B1 * | 4/2001 | Tullis et al. | ........... 250/208.1 |
| 6,225,617 B1 | 5/2001 | Dandliker et al. | |
| 6,233,368 B1 | 5/2001 | Badyal et al. | |
| 6,281,881 B1 | 8/2001 | Siddiqui et al. | |
| 6,281,882 B1 | 8/2001 | Gordon et al. | |
| 6,326,950 B1 | 12/2001 | Liu | |

(Continued)

*Primary Examiner* — Prabodh M Dharia

(57) ABSTRACT

A speckle-based trackball apparatus with an optical architecture employing curved-wavefront illumination beam or a modified imaging lens and aperture configuration is provided. The apparatus includes a trackball configured to be rotated by a user. In the curved-wavefront embodiment, an illuminator is configured to illuminate a spot area of the curved surface of the trackball with a curved-wavefront illumination beam so that an ensemble of optical features used for motion sensing interact with the illumination beam at different phase points as a function of a location within the illuminated spot area on the curved surface of the trackball. In the modified imaging lens and aperture configuration, the aperture is positioned between the back focal plane and the image plane of the imaging lens, and the illuminator may be configured to illuminate a portion of the trackball with a planar-wavefront illumination beam. Other embodiments, aspects and features are also disclosed.

20 Claims, 11 Drawing Sheets

900

U.S. PATENT DOCUMENTS

| | | |
|---|---|---|
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| D464,352 S | 10/2002 | Kerestegian |
| 6,462,330 B1 | 10/2002 | Venkat et al. |
| 6,476,970 B1 | 11/2002 | Smith |
| 6,529,184 B1 | 3/2003 | Julienne |
| 6,567,584 B2 * | 5/2003 | Carlisle et al. .................. 385/33 |
| 6,585,158 B2 | 7/2003 | Norskog |
| 6,603,111 B2 | 8/2003 | Dietz et al. |
| 6,621,483 B2 | 9/2003 | Wallace et al. |
| 6,642,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 7,034,805 B2 * | 4/2006 | Su ................................. 345/165 |
| 7,042,575 B2 * | 5/2006 | Carlisle et al. ................ 356/498 |
| 7,116,427 B2 * | 10/2006 | Baney et al. .................. 356/498 |
| 7,221,356 B2 * | 5/2007 | Oliver et al. .................. 345/166 |
| 7,227,531 B2 * | 6/2007 | Lutian ........................... 345/163 |
| 7,247,832 B2 * | 7/2007 | Webb ........................ 250/214 R |
| 7,268,341 B2 * | 9/2007 | Lehoty et al. ................. 250/221 |
| 7,649,160 B2 * | 1/2010 | Colomb et al. ............ 250/201.9 |
| 2002/0110320 A1 * | 8/2002 | Carlisle et al. .................. 385/33 |
| 2002/0130835 A1 | 9/2002 | Brosnan |
| 2002/0158300 A1 | 10/2002 | Gee |
| 2002/0190953 A1 | 12/2002 | Gordon et al. |
| 2003/0020690 A1 * | 1/2003 | Chen et al. ..................... 345/167 |
| 2003/0034959 A1 | 2/2003 | Davis et al. |
| 2003/0058506 A1 | 3/2003 | Green et al. |
| 2003/0085876 A1 * | 5/2003 | Su ................................. 345/166 |
| 2003/0142288 A1 | 7/2003 | Kinrot et al. |
| 2004/0084610 A1 | 5/2004 | Leong et al. |
| 2004/0189593 A1 | 9/2004 | Koay |
| 2005/0024336 A1 | 2/2005 | Xie et al. |
| 2005/0024623 A1 | 2/2005 | Xie et al. |
| 2005/0035947 A1 * | 2/2005 | Lutian ........................... 345/166 |
| 2005/0083303 A1 | 4/2005 | Schroeder et al. |
| 2005/0094154 A1 * | 5/2005 | Baney et al. .................. 356/499 |
| 2005/0190157 A1 * | 9/2005 | Oliver et al. .................. 345/166 |
| 2005/0248535 A1 * | 11/2005 | Sawyer ........................ 345/167 |
| 2005/0259078 A1 * | 11/2005 | Roxlo et al. .................. 345/166 |
| 2005/0259097 A1 * | 11/2005 | Lehoty et al. ................. 345/207 |
| 2005/0259267 A1 * | 11/2005 | Carlisle et al. ................ 356/498 |
| 2006/0091301 A1 * | 5/2006 | Trisnadi et al. ................ 250/226 |
| 2007/0057165 A1 * | 3/2007 | Webb ........................... 250/221 |
| 2007/0126700 A1 * | 6/2007 | Wright ......................... 345/161 |
| 2007/0138377 A1 * | 6/2007 | Zarem .......................... 250/221 |
| 2008/0068451 A1 * | 3/2008 | Hyatt ............................. 348/36 |
| 2008/0265130 A1 * | 10/2008 | Colomb et al. ............ 250/201.9 |
| 2010/0282847 A1 * | 11/2010 | Lei et al. ....................... 235/438 |
| 2011/0128220 A1 * | 6/2011 | Bynum et al. ................ 345/157 |

* cited by examiner

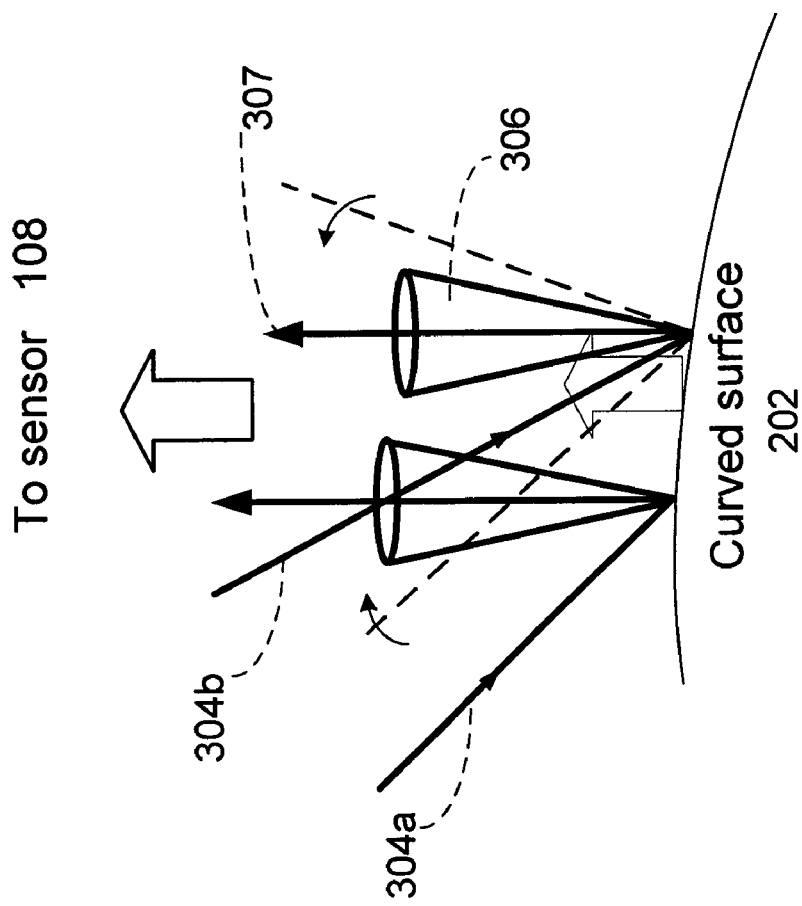

| Parameter | Design 1 | Design 2 |
|---|---|---|
| Trackball radius, R | 3.5 mm | 9.5 mm |
| Beam FWHM at trackball surface, D | 0.6 mm | 0.6 mm |
| Illumination incident angle, $\alpha_0$ | 30° | 30° |
| Illumination F/# | F/2.9 | F/7.9 |

| Parameter | Design 1 | Design 2 |
|---|---|---|
| Trackball radius, R | 3.5 mm | 9.5 mm |
| Aperture. Zaper* | 5.18 mm | 4.09 mm |

*Zaper for flat surface is 2.88 mm

SPECKLE-BASED OPTICAL NAVIGATION ON CURVED TRACKING SURFACE

TECHNICAL FIELD

The present invention relates generally to trackball devices for user input.

DESCRIPTION OF THE BACKGROUND ART

User input devices, such as computer mice, touch screens, trackballs and the like, are used for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse.

It is highly desirable to improve user input devices.

SUMMARY

One embodiment relates a speckle-based trackball apparatus with a curved-wavefront illumination beam. The apparatus includes a trackball which is configured to be rotated by a user. An illuminator is configured to illuminate a portion of the trackball with a curved-wavefront illumination beam so that optical features emanate from the illuminated portion of the trackball. Imaging optics is configured to image the optical features emanating from the illuminated portion of the trackball, and an array of photosensitive elements is configured to detect intensity data relating to the optical features imaged by the imaging optics.

Another embodiment relates a speckle-based trackball apparatus with an imaging aperture which is positioned between the back focal plane and the image plane of the imaging lens. In this embodiment, the illuminator may be configured to illuminate a portion of the trackball with a planar-wavefront illumination beam.

Other embodiments, aspects and features are also disclosed.

BRIEF DESCRIPTION OF THE DRAWINGS

FIG. 3 is a high-level diagram depicting the scattering of light using curved wavefront illumination for a speckle-based trackball or similar device in accordance with an embodiment of the invention.

DETAILED DESCRIPTION

User input devices include mouse devices, trackballs, and other such devices. The present application relates to trackball and similar devices.

Mechanical trackball devices disadvantageously provide low performance, especially in terms of tracking finesse and resolution, and are susceptible to wear. Optical trackball devices may provide higher performance and are generally less susceptible to wear. One potential technology for optical trackball devices involves using laser light and a speckle-based optical navigation sensor. Such a laser-based device may have performance advantages, such as lower power requirements, compared to a device based on light emitting diode (LED) technology.

However, applicants have observed that straightforward implementations of optical trackball devices involves using laser light and a speckle-based optical navigation sensor have rather poor tracking performance. The poor tracking performance may be observed in terms of resolution, speed, tracking finesse, and/or a limitation to narrow trackball surface coverage.

The present disclosure relates generally to trackball user input devices (trackball devices). More particularly, the present disclosure relates to trackball devices which use laser light and a speckle-based optical navigation sensor (laser-speckle-based trackball devices). Embodiments disclosed herein advantageously improves the tracking performance of laser-speckle-based trackball devices.

Figure 1:
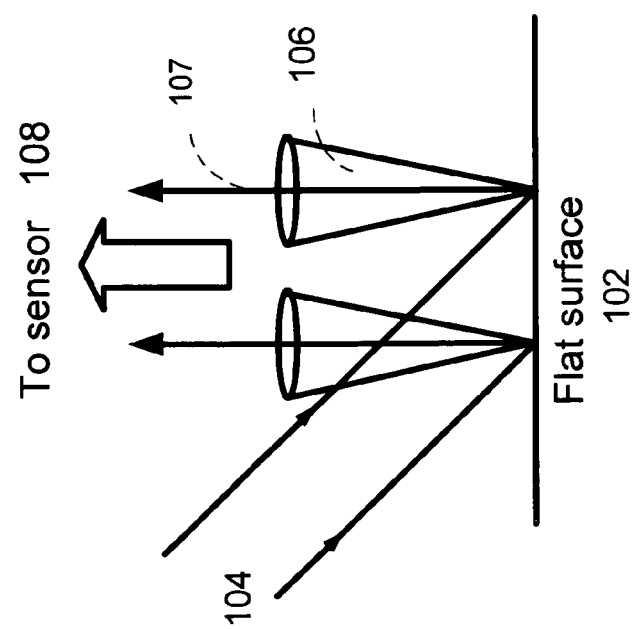
FIG. 1 is a high-level diagram depicting the scattering of light for a conventional speckle-based mouse device.

FIG. 1 is a high-level diagram depicting the scattering of light for a speckle-based mouse device. The illustrated configuration 100 in this diagram shows incoming light 104 is scattered from a flat surface 102 over which the mouse device is being translated by a user. For a speckle-based mouse device, the incoming light 104 comprises coherent light (i.e. laser light). The optic is designed such that the scatter light that contribute to the speckle formation come from cones which axes are parallel. The scattered light contributing to formation of the speckle pattern is shown from a couple of example points on the surface, as represented by the scattering cones 106 depicted in the figure. As shown, the centers 107 of the scattering cones 106 are parallel and pointed in the direction of the optical motion sensor 108. The optical motion sensor 108 may comprise a speckle-pattern translation based two-dimensional motion sensor device.

Using such a mouse device, motion of the sensor 108 relative to the flat surface 102 may be tracked. More particularly, such a mouse device may be capable of tracking x and y displacements (i.e. displacements in two dimensions) of the sensor 108 relative to the flat surface 102.

Figure 2:
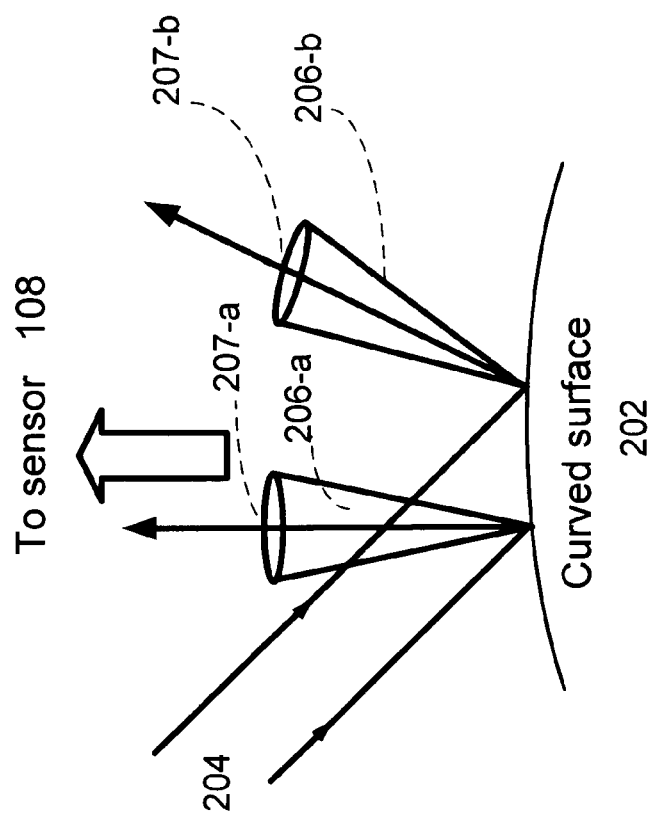
FIG. 2 is a high-level diagram depicting the scattering of light for a straightforward implementation of a speckle-based trackball device.

FIG. 2 is a high-level diagram depicting the scattering of light for a straightforward implementation of a speckle-based trackball device. The illustrated configuration 200 in this diagram shows the incoming light 204 is scattered from the curved surface 202 of the trackball. Here, the scattered light contributing to formation of the speckle pattern is shown from a couple of points on the curved surface 202, as represented by the scattering cones 206-$a$ and 206-$b$ depicted in the figure. Here, one can see that the centers 207-$a$ and 207-$b$ of the scattering cones 206-$a$ and 206-$b$, respectively, are not parallel to each other. Hence, while the first illustrated scattering cone center 207-$a$ is shown as being in the direction of the sensor 108, the second illustrated scattering cone center 207-$b$ is shown as being in a different direction which is not in the direction of the sensor 108.

With a conventional implementation of this configuration 200, a very limited (narrow) area of the curved surface 202 may be usefully illuminated for tracking purposes. Illuminating points outside this useful area, for example point 206-$b$ in FIG. 2, would result in degradation of the speckle pattern in the conventional implementation. Here, degradation of the speckle pattern means that features of the speckle pattern change as the curved surface 202 is translated relative to the sensor 108. In comparison, an non-degraded speckle pattern has features which remain substantially consistent during translation; although the pattern itself is translated, the features of the pattern do not change much. Disadvantageously, the limited useful area for illumination in the conventional implementation reduces the potential tracking performance of the device.

The present application discloses configurations and designs which provide for higher tracking performance and overcomes the problem of narrow tracking surface coverage discussed above in relation to FIG. 2.

FIG. 3 is a high-level diagram depicting the scattering of light using curved wavefront illumination for a speckle-based trackball or similar device in accordance with an embodiment of the invention. The illustrated configuration 300 in FIG. 3 provides incoming light 304 which has a curved wavefront, rather than the incoming light 104 and 204 with flat or nearly flat wavefronts provided in FIGS. 1 and 2, respectively. A curved wavefront means that a wavefront of the beam with constant phase is curved, not flat. For example, the wavefront with constant phase may be spherical in shape. Two example incoming light rays 304-$a$ and 304-$b$ are depicted. As explained in further detail below in relation to FIGS. 4B and 5, these representative light rays 304-$a$ and 304-$b$ are configured so that, if not for the trackball, they would converge at a point.

Advantageously, applicants have determined that such a curved-wavefront incoming light beam 304 scatters from the curved (in this case, spherical) surface 202 so as to result in scattering shown in FIG. 3. The scattering which contributes to formation of the speckle pattern is shown representatively by the scattering cones 306 whose centers point in a same direction 307 towards the sensor 108 from various points of the curved surface 202. Because the scattering is in the same direction from various points on the curved surface 202, a larger area on the curved surface 202 may be illuminated for tracking purposes while avoiding undue degradation of the speckle pattern.

Figure 4A:
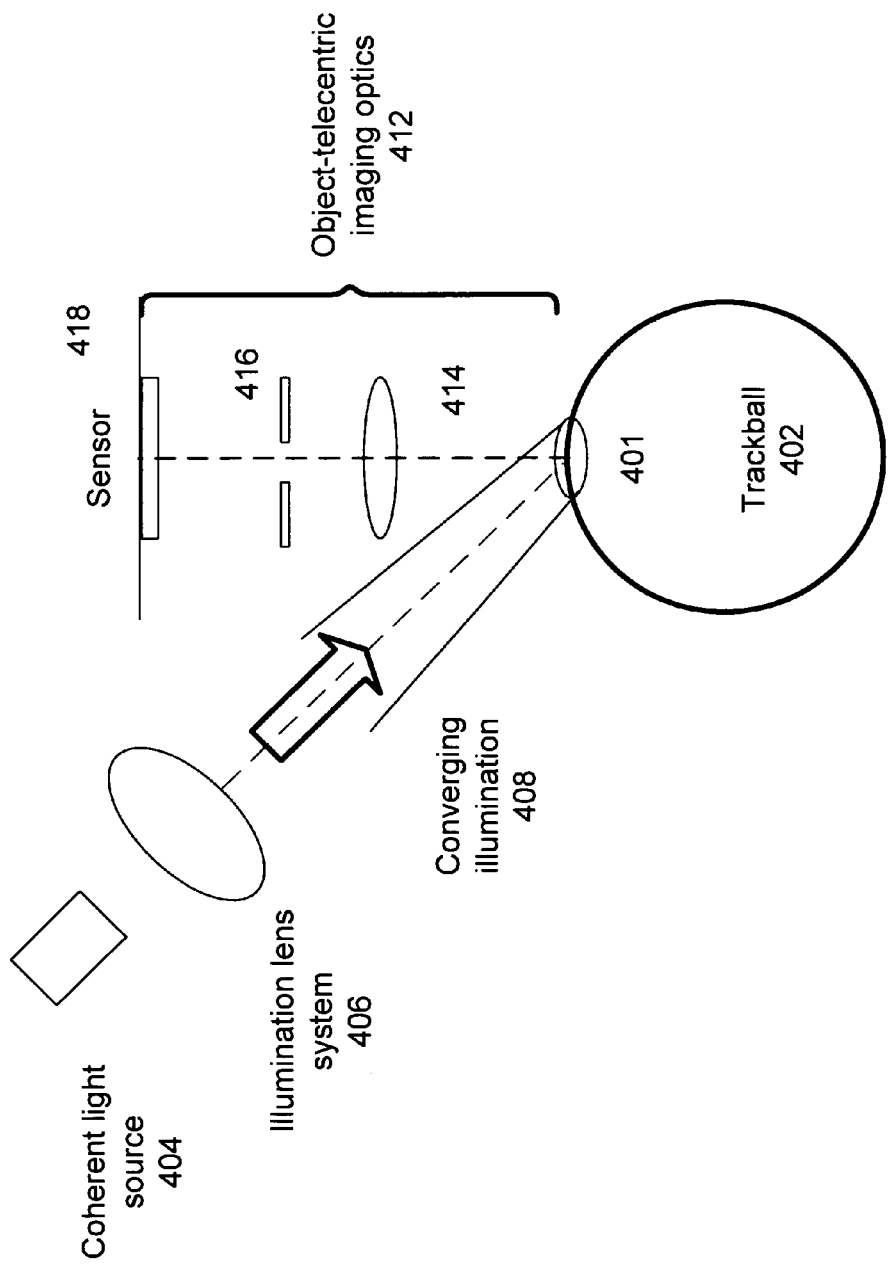
FIG. 4A is a schematic diagram of components in a speckle-based trackball apparatus using curved wavefront illumination in accordance with an embodiment of the invention.

FIG. 4A is a schematic diagram of components in a speckle-based trackball apparatus 400 using curved-wavefront illumination in accordance with an embodiment of the invention. The apparatus 400 includes a trackball 402 which may be rotated by manipulation by a user.

A coherent light source 404 and an illumination lens system 406 generates a converging curved-wavefront illumination beam 408 which illuminates an area 410 on the spherical surface of the trackball 402. As discussed above in relation to FIG. 3, the curved-wavefront incoming light beam 408 scatters from the spherical surface of the trackball 402 so as to result in scattering in a same direction from various points of the spherical surface. Advantageously, because the scattering is in the same direction from various points on the spherical surface, a relatively surface area may be illuminated for tracking purposes while avoiding undue degradation of the speckle pattern.

Imaging optics 412 receives light scattered from the trackball surface. In a preferred embodiment, the imaging optics 412 comprises object-telecentric imaging optics. In object-side telecentric imaging, the angular-extent of the contributing rays at each image point is substantially field-point independent, and the speckle pattern is substantially translation invariant for displacements small compared to the imaging system field of view.

In one embodiment, the object-telecentric imaging optics may comprise an imaging lens 414 and an aperture 416 located at the back focal plane of the imaging lens 414. The optical distance f equals the actual distance between the imaging lens 414 and the back focal plane in a case where the medium is air or vacuum, but that if a material with an index of refraction different from one is used, then the actual distance between the lens 414 and the aperture 416 is to be adjusted accordingly. The aperture 416 may comprise, for example, a purposely introduced opaque structure with transparent sections. Alternatively, the aperture 416 may comprise a lens in the system or may comprise other means for defining such an aperture.

The two-dimensional motion sensor 418 may be configured at the image plane of the lens 414. The two-dimensional motion sensor 418 may comprise at least two sets of multiple CMOS photodiode arrays and various electronics circuitry. The photodiode arrays may be configured, for example, to provide displacement measurements along two orthogonal axes, x and y. One embodiment of the detector arrays and electronics for the motion sensor 418 are further described below in relation to FIGS. 7 and 8.

Figure 4B:
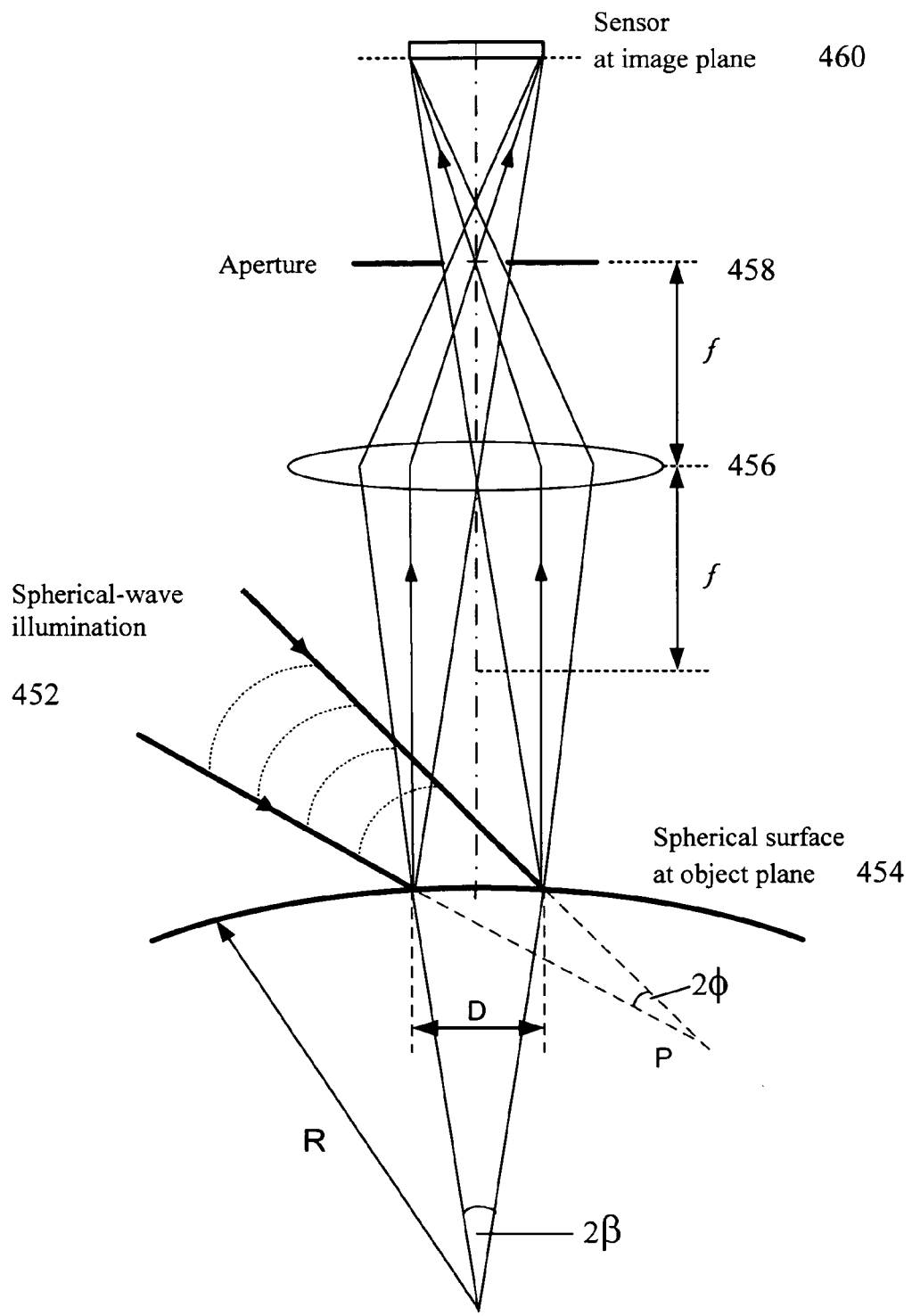
FIG. 4B is a schematic diagram showing the geometry of converging illumination onto a spherical tracking surface in accordance with an embodiment of the invention.

FIG. 4B is a schematic diagram showing the geometry of converging illumination onto a spherical tracking surface in accordance with an embodiment of the invention. Consider that the radius of the spherical tracking surface is R, and the major axis diameter of the beam footprint of the spherical-wave illumination 452 at the intersection with the trackball surface 454 is D. As depicted in FIG. 4B, the angle $\beta$ is equal to $\sin^{-1}(D/2R)$. The spherical illumination beam 452 converges at a point P, where the converging half-angle is $\phi$.

The imaging lens 456 with a focal distance of f may be configured as shown in FIG. 4B. The imaging aperture 458 may be positioned a focal distance f behind the imaging lens 456 (at the back focal plane of the imaging lens 456). The sensor 460 is positioned at the image plane of the imaging lens 456.

Figure 5:
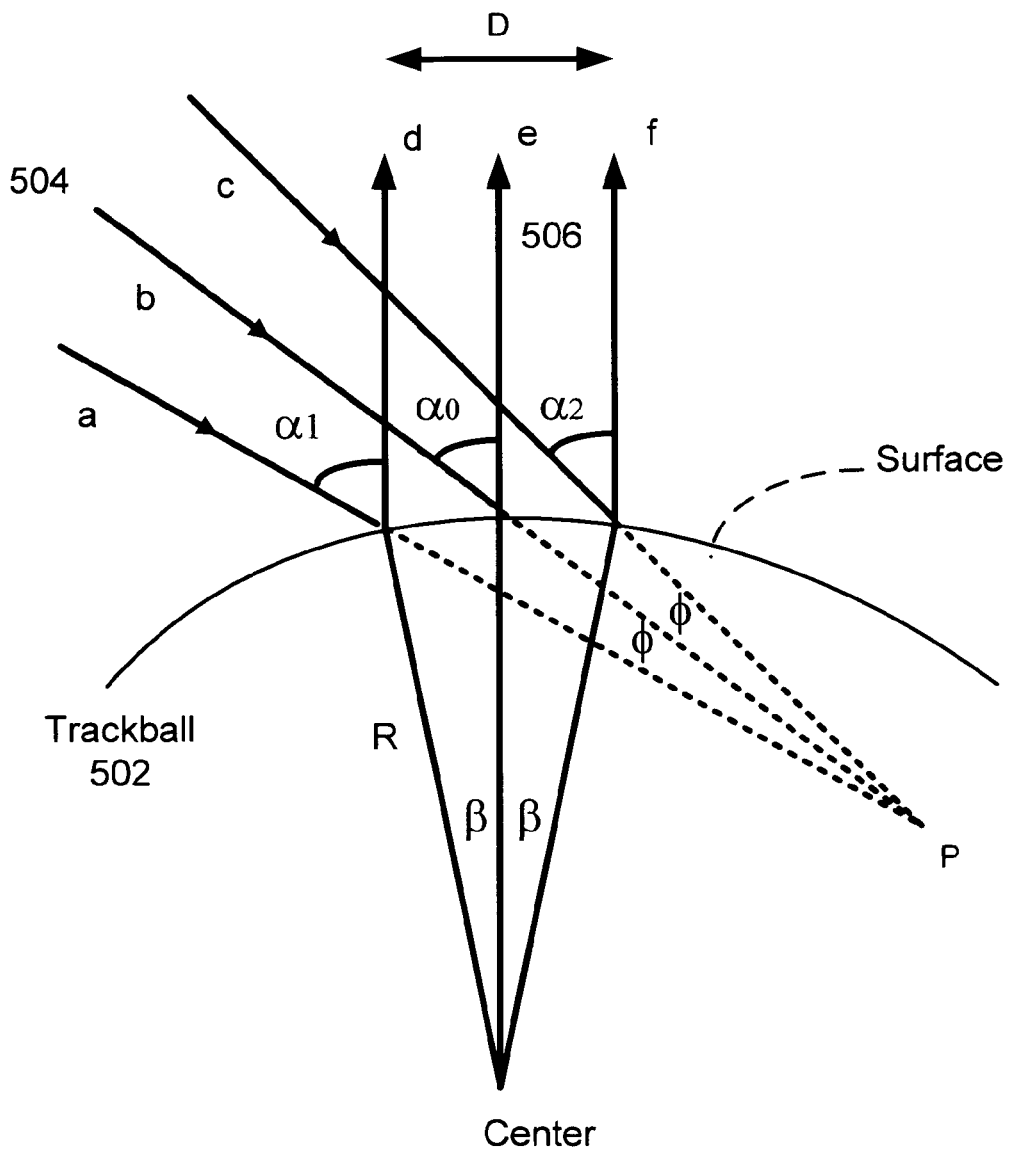
FIG. 5 is a ray diagram depicting the scattering of light using curved wavefront illumination for a speckle-based trackball device in accordance with an embodiment of the invention.

FIG. 5 is a ray diagram depicting the scattering of light using spherical wavefront illumination for a speckle-based trackball device in accordance with an embodiment of the invention. Consider that the radius of the trackball is R, and the major axis diameter of the beam footprint at the intersection with the trackball surface is D.

Depicted are three incoming rays 504 *a, b* and *c* and corresponding scattered rays 506 *d, e,* and *f* which contribute to the formation of the speckle pattern. Center incoming ray b causes scattered ray e, incoming ray a causes scattered ray d, and incoming ray c causes scattered ray f. Incoming rays a and c define the edges of the beam footprint on the major axis, and where incoming ray b is at the center of the beam footprint. The angle of illumination is $\alpha_0$, so the angle between center incoming ray b and scattered ray e is also $\alpha_0$. The angle between incoming ray a and scattered ray d is $\alpha_1$, and angle between incoming ray c and scattered ray f is $\alpha_2$. In accordance with an embodiment of the invention, the curved-wavefront incoming illumination is configured such that incoming rays 504 *a, b* and *c converge on point P.*

The F-number (F/#) or focal ratio of illumination is given by $$F/\# = 1/(2 \tan \phi),$$

where the converging half-angle $\phi \approx 2\beta$, and $\beta = \sin^{-1}(D/2R)$.

Although a concave spherical surface is used as a specific case, the same or similar technique may be applied for any general curved surfaces. For the general case, however, the existence of a satisfactory solution, nor a practical implementation, are not always guaranteed.

Figures 6A, 6B:
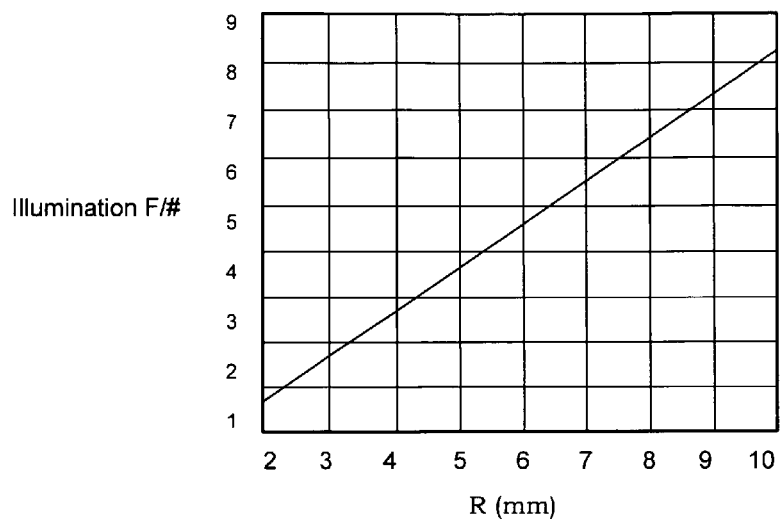
FIG. 6A is a graph showing the dependence of the illumination F-number for a speckle-based trackball device using spherical wavefront illumination in accordance with embodiments of the invention.
FIG. 6B shows parameters for two design implementations of a speckle-based trackball device using spherical wavefront illumination in accordance with embodiments of the invention.

FIG. 6A is a graph showing the dependence of the illumination F-number for a speckle-based trackball device using spherical wavefront illumination in accordance with embodiments of the invention. As seen, in this case, the illumination F-number (F/#) increases linearly with increasing trackball radius R.

FIG. 6B shows parameters for two design implementations of a speckle-based trackball device using spherical wavefront illumination in accordance with embodiments of the invention. As shown, for a first design (Design 1), the trackball radius, R, is 3.5 mm, the beam full-width at half-maximum (FWHM) at the trackball surface, D, is 0.6 mm, the illumination incident angle $\alpha_0$ is 30 degrees, and the illumination F-number is F/2.9.

As shown, for a second design (Design 2), the trackball radius, R, is 9.5 mm, the beam full-width at half-maximum (FWHM) at the trackball surface, D, is 0.6 mm, the illumination incident angle $\alpha_0$ is 30 degrees, and the illumination F-number is F/7.9.

Other designs may be implemented in accordance with the above description.

Figure 7:
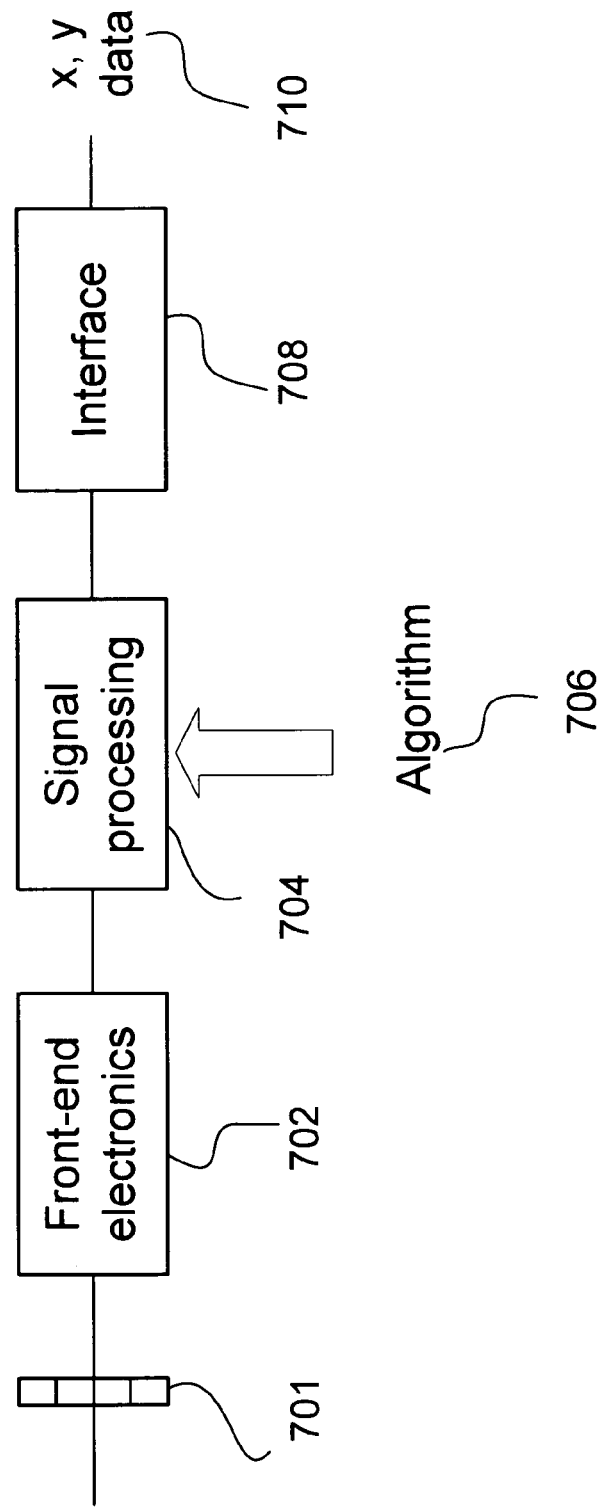
FIG. 7 depicts detector arrays and electronics for an example two-dimensional motion sensor in accordance with an embodiment of the invention.

FIG. 7 depicts detector arrays 701 and electronics for an example two-dimensional motion sensor in accordance with an embodiment of the invention. The detector arrays 701 Groups of the photodiodes in each detector array may be combined using passive electronic components in front-end electronics circuitry 702 to produce group signals. The group signals may be subsequently processed using an algorithm 706 by the signal processing circuitry 704 to produce an (x, y) signal providing information on the magnitude and direction of displacement in x and y directions. The (x,y) signal may be converted by the interface circuitry 708 to x,y data 710 which may be output. Sensors using this detection technique may, for example, have arrays of interlaced groups of linear photodiodes known as "differential comb arrays." Other sensor types may also be used.

Figure 8:
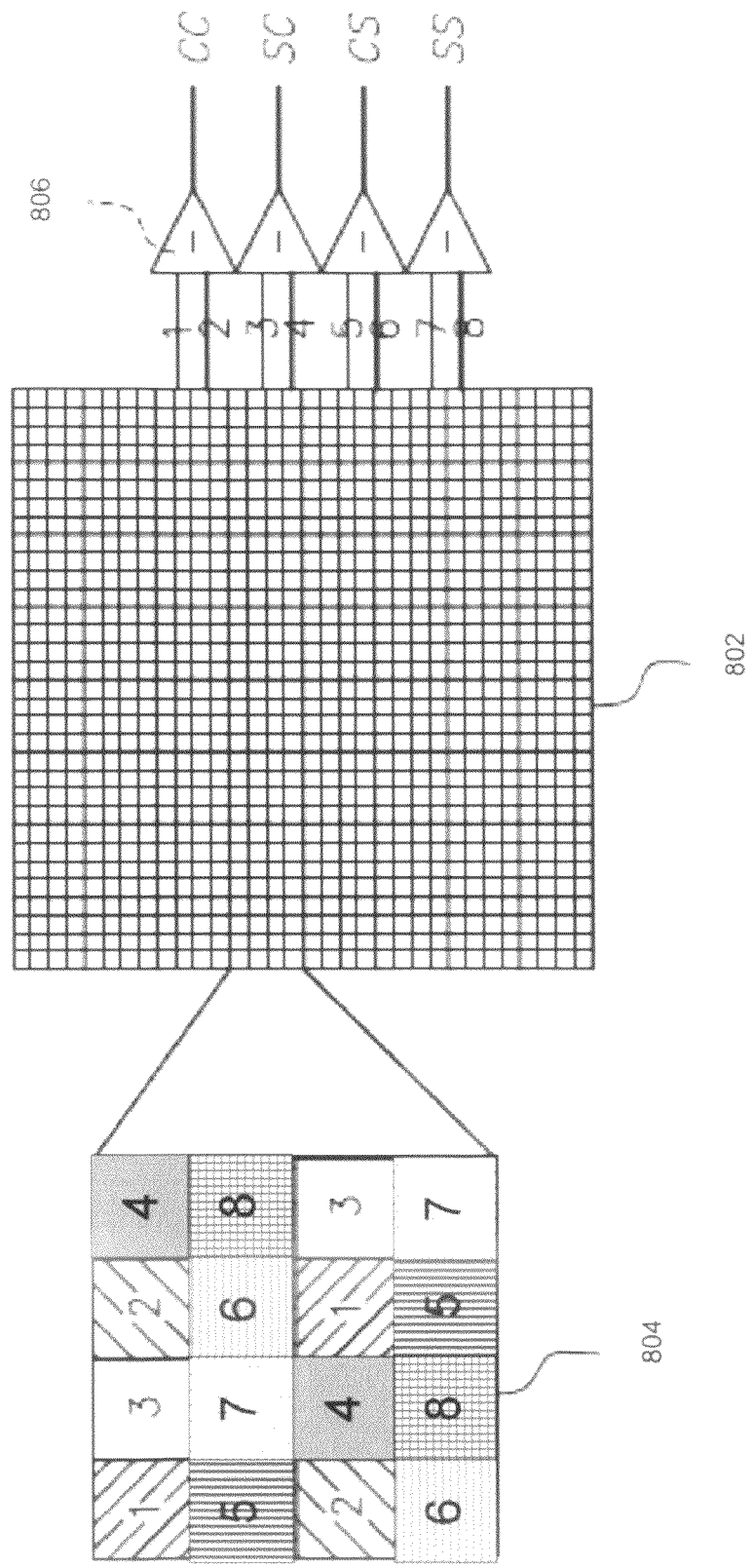
FIG. 8 is a schematic diagram of a two-dimensional comb array in accordance with an embodiment of the invention.

In one specific embodiment, comb array detection is performed by a two-dimensional comb-array to obtain estimations of displacements in x and y. FIG. 8 is a schematic diagram of a two-dimensional comb array in accordance with an embodiment of the invention. An example two-dimensional array 802 of photodiode detector elements is shown. The 2D array 802 is made up of 64 sub-arrays 804 organized in an 8-by-8 matrix. An expanded view of one such sub-array 804 is shown on the left side of the figure.

Each sub-array 804 comprises 16 detector elements organized in a 4-by-4 matrix. The 16 detector elements in each sub-array 804 are each identified as being a member of one of eight groups of elements. The group number associated with each detector element of each sub-array 804 is shown by the number (1, 2, 3, 4, 5, 6, 7, or 8) labeling the element in the expanded view. The signals from each group are electrically ganged together for the entire array 802. The resultant group signals (numbered 1 through 8) are output from the array 802 (as shown on the right side of the figure).

Differential circuitry 806 is used to generate differential signals from pairs of the group signals. A first differential signal CC is generated by the difference of signals 1 and 2. A second differential signal SC is generated by the difference of signals 3 and 4. A third differential signal CS is generated by the difference of signals 5 and 6. A fourth differential signal SS is generated by the difference of signals 7 and 8. These four differential signals contain the information of the in-phase and quadrature signals in the x and y directions.

In another embodiment, two one-dimensional comb arrays may be used in the sensor instead of a two-dimensional comb array sensor. In another embodiment, an image correlation sensor may be used instead of a differential comb array sensor.

Figure 9A:
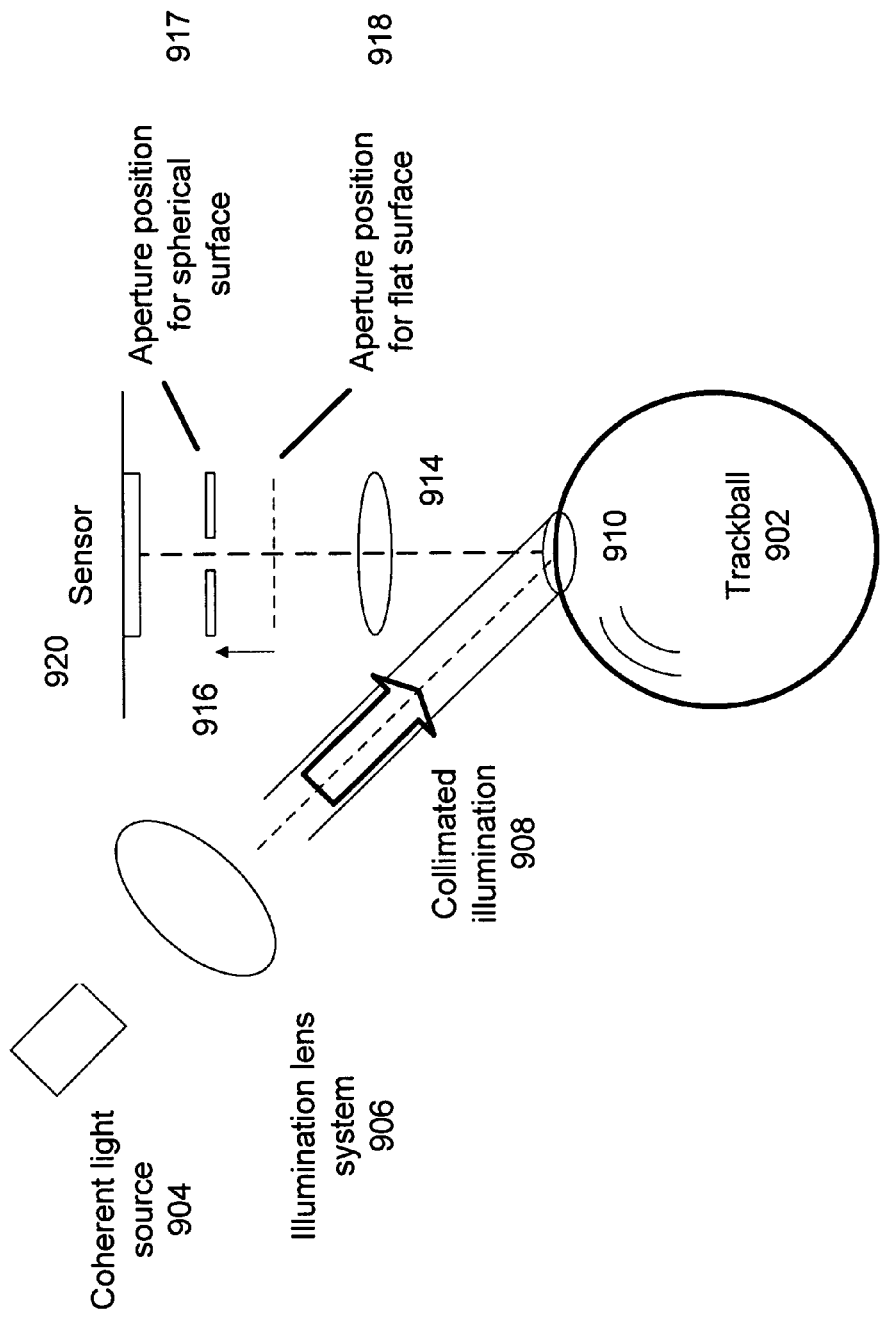
FIG. 9A is a schematic diagram of components in a speckle-based trackball apparatus using collimated illumination and a re-positioned aperture in accordance with an embodiment of the invention.

FIG. 9A is a schematic diagram of components in a speckle-based trackball apparatus 900 using collimated illumination and a re-positioned aperture in accordance with an embodiment of the invention. The apparatus 900 includes a trackball 902 which may be rotated by manipulation by a user.

A coherent light source 904 and an illumination lens system 906 generates a collimated illumination beam 908 having a planar wavefront which illuminates an area 910 on the spherical surface of the trackball 902. As discussed above in relation to FIG. 2, the planar wavefront incoming light beam 908 scatters from the spherical surface of the trackball 402 so as to result in scattering in different directions from various points of the spherical surface.

Imaging optics receives light scattered from the trackball surface. In a preferred embodiment, the imaging optics may comprise an imaging lens 914 and an aperture 916 located at a position 917 between the back focal plane (i.e. the aperture position 918 for a flat surface) and the image plane (at which the sensor 920 is located) of the imaging lens 914. The aperture 916 may comprise, for example, a purposely introduced opaque structure with transparent sections. Alternatively, the aperture 916 may comprise a lens in the system or may comprise other means for defining such an aperture.

The two-dimensional motion sensor 920 may be configured at the image plane of the lens 914. The two-dimensional motion sensor 920 may comprise a 2D comb-array, for example, such as the one described above in relation to FIG. 8.

Figure 9B:
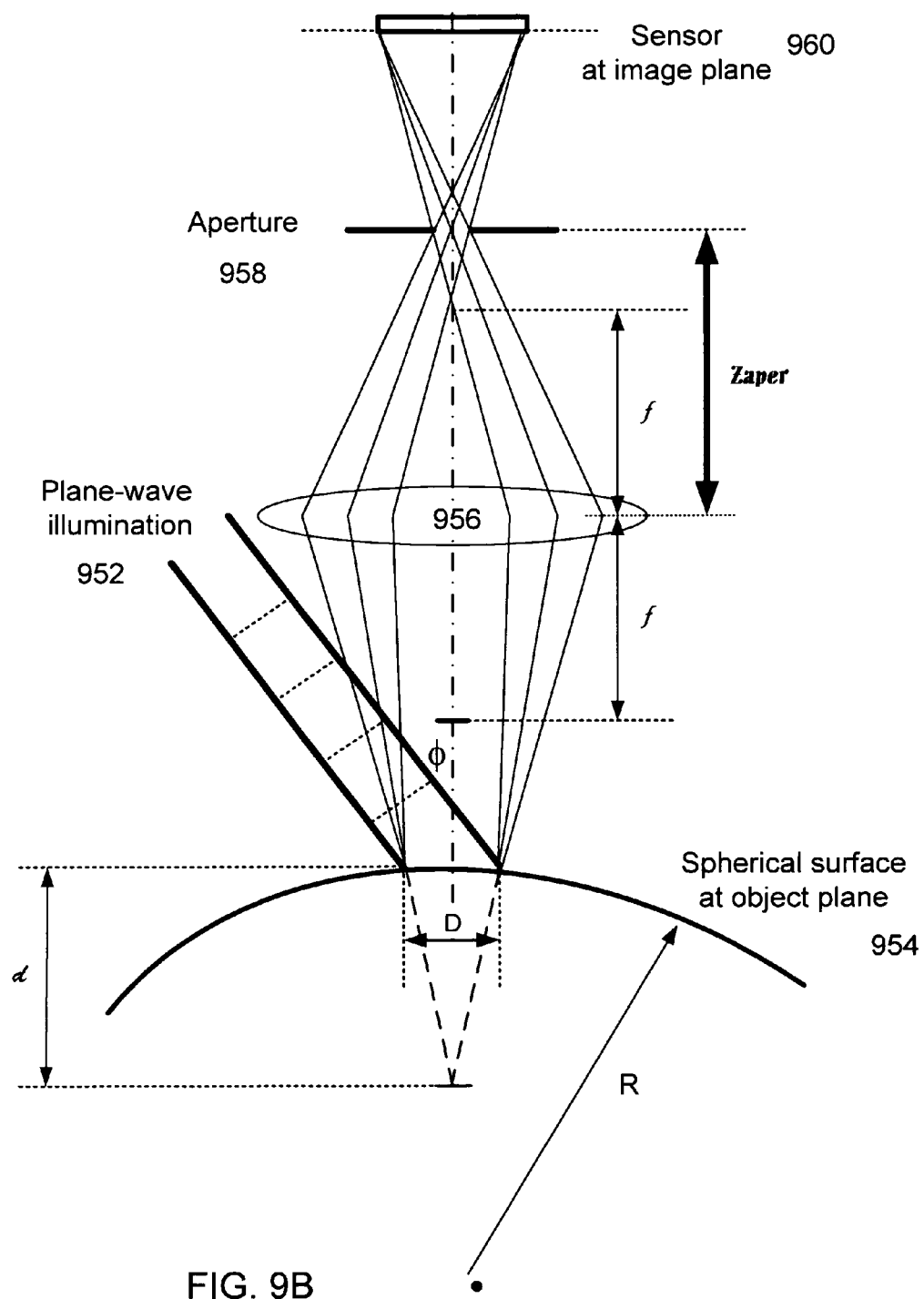
FIG. 9B is a schematic diagram showing the geometry of collimated illumination onto a spherical tracking surface using a re-positioned aperture in accordance with an embodiment of the invention.

FIG. 9B is a schematic diagram showing the geometry of collimated plane-wave illumination 952 onto a spherical tracking surface 954 using an imaging lens 956 and a re-positioned aperture 958 in accordance with an embodiment of the invention. In this embodiment, the aperture 958 is repositioned to compensate for the effect of the spherical surface (in comparison to a flat tracking surface). Moving the aperture 958 away from back-focal-plane of the imaging optic corresponds to selecting the constant sets of rays with tilted axes.

The optimum aperture location is conjugate to the point d underneath the spherical surface, where the axes of the constant set of rays converge. More particularly, the preferred aperture position is at $z_{aper}$ (measured from the lens' principal plane), which is given by $$z_{aper} = f + \frac{mf^2}{f+md},$$

where f is the focal length, and m the magnification, of the imaging optical lens 956. To a good approximation, the distance d is given by $$d \approx \frac{R}{1+\cos\theta}.$$

where R is the ball radius and θ the illumination incident angle. The aperture diameter must also be modified to conform with the designed numerical aperture.

As an example, we take a "standard" system that operates on a flat surface with the following parameters:

| | |
|---|---|
| Illumination incident angle | θ = 30°, |
| Illumination beam diameter | D = 0.6 mm, |
| Optical magnification | m = 1.68, |
| Imaging lens effective focal length | f = 2.88 mm, |
| Standard (flat surface) aperture location | $z_{aper, STD}$ = 2.88 mm , |

In accordance with this embodiment, we modify the above aperture position for an optical trackball. For a given focal length f=2.88 mm, the dependence of the aperture position 958 on the ball radius is shown by the graph in FIG. 10. A flat surface is equivalent to an infinite radius. Hence, $z_{aper}(R=\infty)$ =f=2.88 mm.

Figures 10, 11:
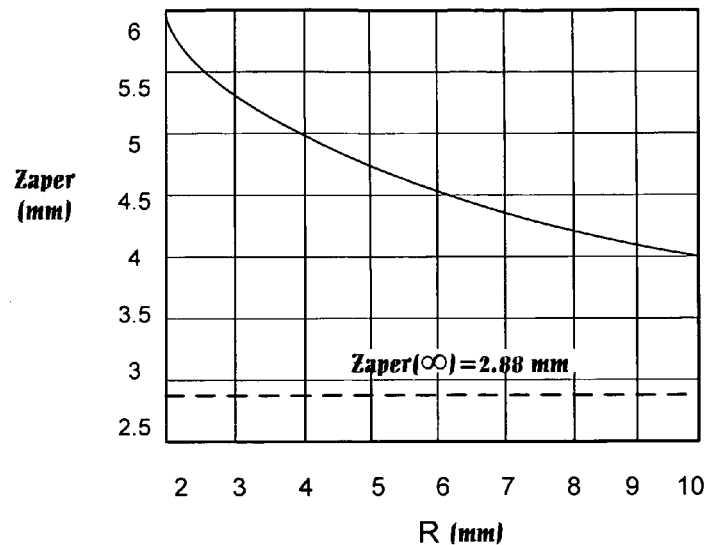
FIG. 10 is a graph showing the dependence of the illumination F-number for a speckle-based trackball device using collimated illumination and a re-positioned aperture in accordance with embodiments of the invention.
FIG. 11 shows parameters for two design implementations of a speckle-based trackball device using collimated illumination and a re-positioned aperture in accordance with embodiments of the invention.

Two specific example configuration parameters are as follows. $z_{aper}$=5.18 mm for R=3.5 mm, and $z_{aper}$=4.09 mm for R=9.5 mm. These example design parameters are depicted in FIG. 11.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A speckle-based trackball apparatus for user input, the apparatus comprising:
a trackball configured to be rotated by a user;
an illuminator configured to illuminate a spot area on a curved surface of the trackball with a curved-wavefront illumination beam so that an ensemble of optical features used for motion sensing interact with the illumination beam at different phase points as a function of a location within the illuminated spot area on the curved surface of the trackball;
imaging optics configured to image the optical features emanating from the illuminated spot area of the trackball; and
an array of photosensitive elements configured to detect intensity data relating to the optical features imaged by the imaging optics.

2. The apparatus according to claim 1, wherein curvature of the curved-wavefront illumination beam is approximately twice the trackball curvature.

3. The apparatus according to claim 1, wherein a radius of the trackball is less than one centimeter.

4. The apparatus according to claim 1, wherein a full-width at half-maximum of the curved-wavefront illumination beam at the illuminated spot area of the curved surface of the trackball is less than one millimeter.

5. The apparatus according to claim 1, wherein the curved-wavefront illumination beam has a focal ratio greater than 2 and less than 8.

6. The apparatus according to claim 1, wherein the illuminator comprises a coherent light source and an optical lens system to form a spherical-wavefront illumination beam, and wherein the optical features comprise a speckle pattern which is a complex interference pattern created by coherent light reflected from the curved surface of the trackball, and wherein the photosensitive elements comprise photodiodes.

7. The apparatus according to claim 1, wherein the imaging optics comprise object-telecentric imaging optics such that, during rotation of the trackball, the optical features imaged by the object-telecentric imaging optics are translated but are substantially invariant in appearance.

8. The apparatus according to claim 7, wherein the object-side telecentric imaging optics comprises:
an aperture; and
a first lens located between the aperture and the illuminated portion of the trackball,
wherein the first lens has a focal length substantially equal to an optical distance between the first lens and the aperture.

9. A method of sensing movement of a trackball for a user input device, the method comprising:
illuminating a portion of the trackball with a curved-wavefront illumination beam so that optical features emanate from the illuminated portion of the trackball;
mapping images of the optical features emanating from the illuminated portion of the trackball to an array of photosensitive elements using imaging optics; and
determining displacement of optical features emanating from the illuminated portion of the trackball in a succession of frames to sense rotational movement of the trackball.

10. The method according to claim 9, wherein curvature of the curved-wavefront illumination beam is approximately twice the trackball curvature.

11. The method according to claim 9, wherein a radius of the trackball is less than one centimeter.

12. The method according to claim 9, wherein a full-width at half-maximum of the curved-wavefront illumination beam at the illuminated portion of the trackball is less than one millimeter.

13. The method according to claim 9, wherein the curved-wavefront illumination beam has a focal ration greater than 2 and less than 8.

14. The method according to claim 9, wherein a coherent light source and an optical lens system is used to form the curved-wavefront illumination beam, wherein the optical features comprise a speckle pattern which is a complex interference pattern created by coherent light reflected from a curved surface of the trackball, and wherein the photosensitive elements comprise photodiodes.

15. The method according to claim 9, wherein the imaging optics comprise object-telecentric imaging optics such that, during rotation of the trackball, the optical features imaged by the object-telecentric imaging optics are translated but are substantially invariant in appearance.

16. The method according to claim 15, wherein the object-side telecentric imaging optics comprises:
   an aperture; and
   a first lens located between the aperture and the illuminated portion of the trackball,
   wherein the first lens has a focal length substantially equal to an optical distance between the first lens and the aperture.

17. A speckle-based trackball apparatus for user input, the apparatus comprising:
   a trackball configured to be rotated by a user;
   an illuminator configured to illuminate a portion of the trackball with an illumination beam so that optical features emanate from the illuminated portion of the trackball; and
   an imaging lens and an imaging aperture which are configured to image the optical features emanating from the illuminated portion of the trackball onto an array of photosensitive elements which is configured to detect intensity data relating to the optical features,
   wherein the imaging aperture is positioned between a back focal plane and an image plane of the imaging lens, and wherein a distance from a principal plane of the imaging lens to the aperture is a focal length, f, of the imaging lens plus $mf^2/(f+md)$, where m is a magnification of the imaging lens and d is approximately equal to $R/(1+\cos \Theta)$, where R is the radius of the trackball, and $\Theta$ is an illumination incident angle.

18. The apparatus according to claim 17, where the illuminator comprises a coherent light source and an optical lens system to form a planar-wavefront illumination beam, and wherein the optical features comprise a speckle pattern which is a complex interference pattern created by coherent light reflected from a curved surface of the trackball, and wherein the photosensitive elements comprise photodiodes.

19. A method of sensing movement of a trackball for a user input device, the method comprising:
   illuminating a portion of the trackball with an illumination beam so that optical features emanating form the illuminated portion of the trackball onto an array of photosensitive elements which is configured to detect intensity data relating to the optical features, wherein the imaging aperture is positioned between a back focal plane and an image plane of the imaging lens; and
   determining displacement of optical features emanating from the illuminated portion of the trackball in a succession of frames to sense rotational movement of the trackball,
   wherein the illuminating is performed using a coherent light source and an optical lens system to form a planar-wavefront illumination beam, and wherein the optical features comprise a speckle pattern which is a complex interference pattern created by coherent light reflected from a curved surface of the trackball, and wherein the photosensitive elements comprise photodiodes.

20. The method according to claim 19, wherein a distance from a principal plane of the imaging lens to the aperture is a focal length, f, of the imaging lens plus $mf^2/(f+md)$, where m is a magnification of the imaging lens and d is approximately equal to $R/(1+\cos \Theta)$, where R is the radius of the trackball, and $\Theta$ is an illumination incident angle.

* * * * *